United States Patent
Pelloie

(10) Patent No.: US 10,452,804 B2
(45) Date of Patent: Oct. 22, 2019

(54) TECHNIQUE FOR DISTRIBUTING ROUTING INTO SUPERFLUOUS METAL SECTION OF AN INTEGRATED CIRCUIT

(71) Applicant: ARM Limited, Cambridge (GB)

(72) Inventor: Jean-Luc Pelloie, Isère (FR)

(73) Assignee: ARM Limited, Cambridge (GB)

( * ) Notice: Subject to any disclaimer, the term of this patent is extended or adjusted under 35 U.S.C. 154(b) by 2 days.

(21) Appl. No.: 15/447,716

(22) Filed: Mar. 2, 2017

(65) Prior Publication Data

US 2018/0253523 A1    Sep. 6, 2018

(51) Int. Cl.
*G06F 17/50* (2006.01)

(52) U.S. Cl.
CPC ...... *G06F 17/5077* (2013.01); *G06F 17/5072* (2013.01); *G06F 17/5081* (2013.01); *G06F 2217/06* (2013.01); *G06F 2217/84* (2013.01)

(58) Field of Classification Search
CPC ............. G06F 17/5045; G06F 17/5072; G06F 17/5077; G06F 17/5068; G06F 17/5081; G06F 2217/06; G06F 2217/08; G06F 2217/12
USPC ........ 716/113, 118–120, 122, 126, 130–135, 716/139
See application file for complete search history.

(56) References Cited

U.S. PATENT DOCUMENTS

| 5,461,576 | A | * | 10/1995 | Tsay | G06F 17/505 716/113 |
| 2010/0100861 | A1 | * | 4/2010 | Frederick | G06F 17/5068 716/119 |
| 2011/0055785 | A1 | * | 3/2011 | Chakanakar | G06F 17/5072 716/126 |
| 2017/0186745 | A1 | * | 6/2017 | Pelloie | H01L 21/823871 |

* cited by examiner

*Primary Examiner* — Nghia M Doan
(74) *Attorney, Agent, or Firm* — Nixon & Vanderhye, P.C.

(57) ABSTRACT

A computer implemented method is described for generating a layout of a circuit block of an integrated circuit. The method comprises receiving input data defining a logical operation of the circuit block, and accessing a cell library providing a plurality of cells that define circuit elements, in order to determine with reference to the input data the cells to be used to implement the circuit block. A place and route tool is then employed to generate the layout by determining a placement of the determined cells and performing a routing operation to determine routing paths to be provided within a plurality of metal layers in order to interconnect the determined cells. The cell library provides cells that define in at least one metal layer one or more superfluous metal sections that are required to comply with design rules but which are unused by the cell. Each cell has cell definition data, and the cell definition data of one or more cells is arranged to identify at least one superfluous metal section as being available for routing. During performance of the routing operation, the place and route tool then references the cell definition data of the determined cells so as to take (Continued)

into account, when determining the routing paths, availability of any superfluous metal sections for routing. This can significantly increase the options available to the place and route tool when determining the appropriate routing paths.

16 Claims, 10 Drawing Sheets

TECHNIQUE FOR DISTRIBUTING ROUTING INTO SUPERFLUOUS METAL SECTION OF AN INTEGRATED CIRCUIT

BACKGROUND

The present technique relates to the field of integrated circuits, and in particular to techniques for generating the layout of a circuit block for such an integrated circuit. The circuit block may represent the entire integrated circuit or a component within the integrated circuit.

In the design of semiconductor integrated circuits, it is known to provide automated tools which use a functional design of a planned circuit block identifying the logical operation that that circuit block is to perform (for example in the form of a gate level netlist or a Register Transfer Level representation of the design) and a cell library providing a set of cells (the cells defining circuit elements, and being "building blocks" for putting together the layout of the circuit block according to the functional design) in order to generate the layout of the circuit block.

In particular, the automated tool may take the form of a place and route tool which places the required cells within a floorplan and then performs a routing operation to determine routing paths to be provided within a number of metal layers in order to interconnect the various cells, so that collectively the cells will perform the required logical operation of the circuit block.

As the complexity of the required circuit blocks increases, it is becoming more and more difficult to accommodate all of the required routing paths within the available metal layers, and it is sometimes the case that the area required for the circuit block may be larger than it would otherwise need to be, so as to provide sufficient space for all of the various routing paths to be provided.

Accordingly, it would be desirable to provide improved techniques for accommodating the required routing paths within the layout of a circuit block.

SUMMARY

In one example, a computer-implemented method of generating a layout of a circuit block of an integrated circuit is provided, comprising: receiving input data defining a logical operation of the circuit block; accessing a cell library providing a plurality of cells that define circuit elements, to determine with reference to the input data the cells to be used to implement the circuit block; and employing a place and route tool to generate the layout by determining a placement of the determined cells and performing a routing operation to determine routing paths to be provided within a plurality of metal layers in order to interconnect the determined cells; the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing; during performance of the routing operation, causing the place and route tool to reference the cell definition data of the determined cells so as to take into account, when determining said routing paths, availability of any superfluous metal sections for routing.

In another example arrangement, a computer program product on a non-transitory storage medium is provided for controlling a computer to perform a method of generating a layout of a circuit block as set out above.

In another example, a non-transitory storage medium is provided storing a cell library comprising a plurality of cells that define circuit elements, the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing to a place and route tool.

In a yet further example, an integrated circuit is provided comprising: a plurality of interconnected circuit elements formed from cells of a cell library, the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing; the plurality of interconnected circuit elements being interconnected by routing paths, and at least one routing path incorporating a portion provided by a superfluous metal section within said at least one metal layer.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
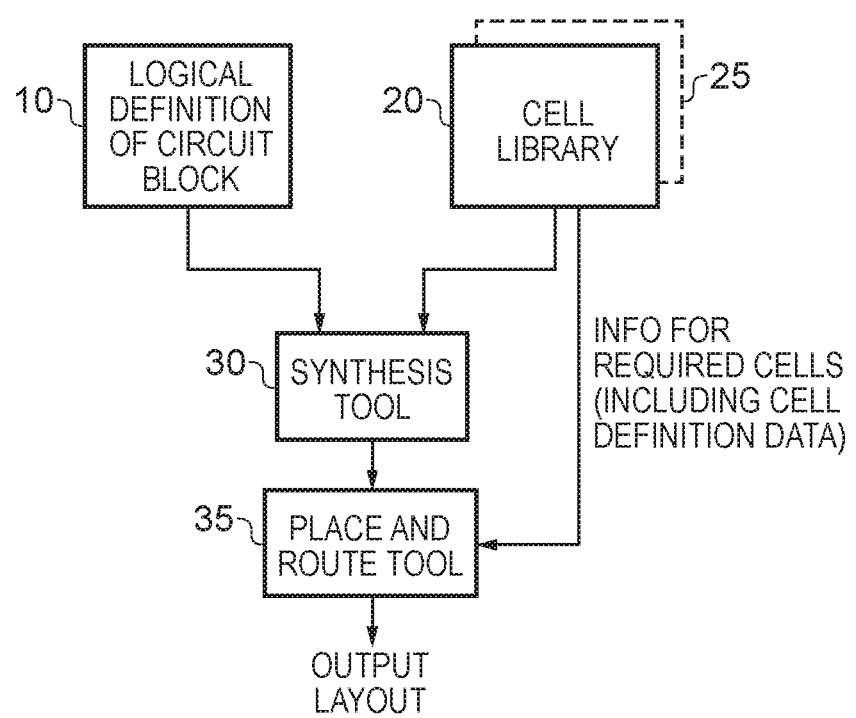
FIG. 1 is a block diagram schematically illustrating components used when generating the layout of a circuit block in accordance with one embodiment.

Before discussing the embodiments with reference to the accompanying figures, the following description of embodiments is provided.

As the processes used to manufacture integrated circuits shrink to ever smaller geometries, this can cause a number of design constraints to be enforced in order to ensure that satisfactory yield levels can be obtained by the foundries manufacturing the integrated circuits. For instance, in advanced CMOS processes, design rules may be imposed on one or more of the metal layers used in the manufacture of integrated circuits. For example, it is known to impose design rules on the first metal layer, referred to herein as the metal zero (M0) layer, to ensure that a regular grid pattern is observed within the M0 layer. In particular, the design rules may require metal sections to be provided on a regular grid and fully occupy the assigned tracks of the grid, other than where cuts are made to isolate particular metal sections. This design rule constraint often means that, in addition to the metal sections required by the cell to form power nets, internal nets, or input and output pins, additional superfluous metal sections may be provided. Typically, when the final integrated circuit is manufactured, such superfluous metal sections are left in an electrically floating state.

Hence within a metal layer that is constrained by such design rules, the only empty space is the isolation space in between the various metal sections imposed by the design rules. When performing routing operations as part of a place and route process, the routing paths are typically provided within the successive metal and via layers above the M0 layer. As the circuit blocks increase in complexity, so the number and complexity of the routing paths required increases, and this can make the task of providing all of the required routing paths within the available metal layers very complex.

In accordance with the techniques described herein, when the cells are defined within the cell library, cell definition data can be arranged to identify at least one superfluous metal section as available for routing. This means that following the receipt of input data defining a logical operation of the circuit block, and accessing of a cell library providing a plurality of cells in order to determine with reference to the input data the cells to be used to implement the circuit block, the place and route tool can then use such cell definition data to potentially increase the freedom available when designing the necessary routing paths. In particular, the place and route tool will generate the layout by determining a placement of the required cells relative to each other, and performing a routing operation to determine the routing paths to be provided between the various cells in order to interconnect the required cells. When at least one of the cells being used has identified within its cell definition data one or more superfluous metal sections as being available for routing, then when the place and route tool performs the routing operation it can take these superfluous metal sections into account when deciding on the routing paths to be used. In particular, if desired, one or more of such superfluous metal sections may be used to form portions of routing paths between cells.

Hence, rather than being constrained to the usual metal layers available for forming the routing paths (for example metal one (M1) and metal two (M2) layers), the routing operation can also use any superfluous metal sections that have been marked as available for routing, to form certain portions of the required routing paths. This can provide significantly enhanced flexibility when determining the routing paths, and hence alleviate the routing path constraints that may otherwise exist. This can enable significant benefits, for example a reduction in the overall area requirements for the circuit block.

It should be noted that the place and route tool is not required to use any superfluous metal sections that are identified as available for routing, but is able to use one or more of those superfluous metal sections when it is considered appropriate.

In one embodiment, once the layout has been generated, then any superfluous metal sections other than those that have been employed within the routing paths will be left in an electrically floating state in the circuit block subsequently manufactured from the layout. Hence, any unused superfluous metal sections are handled in the standard manner.

There are a number of ways in which the place and route tool can be appraised of the availability of superfluous metal sections as identified by the cell definition data. For example, in one embodiment, the method further comprise the step of providing the place and route tool with an abstract view of each determined cell as derived from the cell definition data. The abstract view identifies each metal section in said at least one metal layer as one of: an input/output pin to which a routing path is connectable; an obstruction that must remain isolated from the routing paths; and a superfluous metal section available for routing.

Hence, the place and route tool can be provided with a modified abstract view that not only identifies the input and output pins to which routing paths need to be connected, and the obstructions that cannot be connected to during the routing operation (and must remain isolated from the routing paths), but also introduces a new category of metal section, namely a superfluous metal section that is available for routing. As mentioned earlier, the place and route tool has the option to use such superfluous metal sections to form portions of routing paths, hence increasing the number of variations available to the place and route tool when constructing the routing paths.

There are a number of ways in which any superfluous metal sections that are not available for routing can be treated by the place and route tool. In one embodiment, any such superfluous metal sections that are unavailable for routing are identified as obstructions in the abstract view. Alternatively, they may simply be ignored, and have no representation within the abstract view.

The at least one metal layer that contains the one or more superfluous metal sections can take a variety of forms, dependent on the semiconductor process being used to manufacture the circuit block. However, in one embodiment, the at least one metal layer is a metal zero (M0) layer. As mentioned earlier, in advanced CMOS processes, the design rules may impose that the M0 layer is fully occupied with metal sections, with the only space being the isolation spacing between the various metal sections imposed by the design rules, and accordingly it is often the case that superfluous metal sections are provided with the M0 layer. As also discussed earlier, such superfluous metal sections are usually merely ignored, and left in an electrically floating state in the final manufactured circuit block. However, the above described technique allows for a repurposing of at least some of those superfluous metal sections, to increase the freedoms available to the place and route tool when constructing routing paths within the circuit block.

As mentioned earlier, various other metal sections may also be provided within the M0 layer. For example, within cells defining an active circuit element, the M0 layer may further provide one or more of: a power supply metal section to connect to a voltage supply; an input metal section to connect the active circuit element to an input signal routing path; an output metal section to connect the active circuit element to an output signal routing path; and an internal metal section to interconnect components of the active circuit element. Such an internal metal section will be unavailable to the place and route tool for use as a portion of a routing path.

When performing the place and route operation, the place and route tool typically performs a block timing analysis in order to ensure that the timing requirements of the circuit block are met by the determined routing paths. As will be well understood, the place and route process is typically an iterative process, and the block timing analysis will typically be performed multiple times during the place and route process so that candidate routing paths are subjected to a timing analysis before a final decision is taken as to whether to use those candidate routing paths or not.

The timing characteristics of a cell will be altered if a superfluous metal structure is used as a portion of a routing path, rather than being left to electrically float. In particular, the parasitic capacitances between various metal sections will change dependent on whether a superfluous metal section is left in an electrically floating state, or is connected to a routing path and hence effectively grounded when considering parasitic capacitance issues.

In one embodiment, the method further comprises during the routing operation, when considering employing at least one superfluous metal section to form a portion of a routing path, performing a timing determination operation to take into account a change in signal timing resulting from use of the at least one superfluous metal section.

There are a number of ways in which the timing determination operation can be performed. In one embodiment the cell library provides, for each cell, associated timing characterisation data assuming any superfluous metal sections are left to electrically float, and for each cell where at least one superfluous metal section is identified in the cell definition data as available for routing, the cell library provides at least one additional set of timing characterisation data for use by the place and route tool when performing said timing determination operation. Hence, in such embodiments, the cell libraries themselves can provide predetermined timing characterisation data not only for the standard case where all superfluous metal sections are left to electrically float, but also for one or more other scenarios where at least one superfluous metal section is used as a routing path. Each time a superfluous metal section is used as a routing path, this will increase the parasitic capacitance within the cell, and accordingly will typically degrade timing performance.

In one embodiment, more than one additional set of timing characterisation data can be specified for the relevant cells that have superfluous metal sections available for use as routing paths, for example to capture different extents to which those superfluous metal sections are used. However, in one simplified embodiment, for each cell where at least one superfluous metal section is identified in the cell definition data as available for routing, the cell library provides one additional set of timing characterisation data for use by the place and route tool when preforming said timing determination operation, said one additional set assuming a worst case timing where all available superfluous metal sections of the cell are used for routing paths. Hence, in such an embodiment, the requirement to produce multiple additional sets of timing characterisation data is removed, but a worst case timing is assumed whenever at least one superfluous metal section within a cell is used for routing. It has been found that in some practical situations, this worst case timing characterisation data is sufficient, since often the worst case timing characterisation will not differ significantly from the real timing as the number of available superfluous metal sections, or their length, may be limited.

However, in an alternative embodiment, instead of the relevant cells providing multiple sets of timing characterisation data, the place and route tool may be arranged to perform during said timing determination operation an on-the-fly timing characterisation of an affected cell to take into account a change in signal timing having regard to which of the at least one superfluous metal sections in the affected cell is to form a portion of a routing path. Such an approach has the benefit that it only accounts for the superfluous metal sections that are actually used to form a portion of the routing path, and hence can increase the accuracy of the timing determination operation. However, such an approach will increase the complexity of the routing operation, and the time taken to perform the routing analysis in order to determine an appropriate set of routing paths to be used.

The cell library available to the place and route tool can take a variety of forms. For example, the cell library may define custom cells, or may define standard cells. In some embodiments, multiple cell libraries may be made available to the place and route tool. In one particular embodiment, the cells are standard cells, and the place and route tool determines the placement of the determined cells by placing them within a plurality of rows having a common row height. By using standard cells, this can simplify place and route considerations, since each of the cells are constrained to have the common row height, or a multiple of that common row height.

The cells of the cell library whose cell definition data is arranged to identify at least one superfluous metal section as available for routing can take a variety of forms. In one embodiment, the cells are active cells that identify circuit elements that actively perform one or more logical computations required to implement the overall logical operation requirements of the circuit block. However, as an alternative, or in addition, one or more of the cells that identify such superfluous metal sections may be inactive cells, also referred to as finishing cells. Examples of such inactive cells are filler cells, cells that implement decoupling capacitors, etc. Sometimes, such cells are used merely to increase the overall floorplan of the circuit layout, and hence provide more overall area for accommodating routing paths. Whilst such inactive cells do not contribute to the required logical operations of the circuit block, and hence do not have input and output pins that need to be connected to by the place and route tool during the routing operation, they will still typically have at least one metal layer whose layout is constrained by the earlier mentioned design rules. Hence, for example, the M0 layer of such an inactive cell may still require a regular grid of metal sections to be provided to fully occupy the M0 layer, and due to the inactive nature of the cell those metal sections may predominantly be superfluous metal sections. Accordingly, by marking one or more of those superfluous metal sections as available for routing, this enables the place and route tool to repurpose those cells, and in particular to make use of the superfluous metal sections within those cells to accommodate portions of routing paths if desired.

The superfluous metals sections that are identified as available for routing can take a variety of forms. For example, they may be simply a metal strip extending within a single metal layer. However, in more complex systems, the superfluous metal sections may themselves extend across multiple metal layers, for example being formed by multiple metal strips in different metal layers interconnected by metal vias.

In one embodiment, the above described method may be extended by further comprising the steps of incorporating the layout of the circuit block within a layout of an integrated circuit, and manufacturing the integrated circuit from the layout of the integrated circuit.

In one example arrangement, a computer program product may be provided on a non-transitory storage medium to control a computer to perform the above described methods for generating a layout of a circuit block. This computer program product may hence for example take the form of a modified place and route tool that is able to take account of the presence within the cell definition data of information identifying at least one superfluous metal section as available for routing, in order to increase the options available when performing the routing operation.

In another example embodiment, a modified cell library may be provided on a non-transitory storage medium, the cell library comprising a plurality of cells that define circuit elements, the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing to a place and route tool.

In a yet further example embodiment, an integrated circuit may be provided comprising a plurality of interconnected circuit elements formed from cells of a cell library, the cell library providing cells that define in at least one metal layer one or more superfluous metal sections that are required to comply with design rules but which are unused by the cell. Each cell has cell definition data, and the cell definition data of one or more cells identifies at least one superfluous metal section as available for routing. The plurality of interconnected circuit elements are interconnected by routing paths, and at least one routing path incorporates a portion provided by a superfluous metal section within said at least one metal layer. Hence, within such an integrated circuit, rather than the routing paths being constrained to the usual metal layers reserved for such routing paths, at least a portion of at least one routing path may be provided by a superfluous metal section within one of the other metal layers.

Particular embodiments will now be described with reference to the Figures.

FIG. 1 is a block diagram illustrating components used in one embodiment to generate a layout of a circuit block. A logical definition 10 of the circuit block is provided. This may take a variety of forms, such as a gate level netlist or an RTL representation of a functional design of a planned circuit block, hence identifying the logical operation of the circuit block. This logical definition 10 is provided to a synthesis tool 30 which also has access to one or more cell libraries 20, 25. Each of the cell libraries will provide a plurality of cells, and each individual cell can specify the layout of an associated circuit element. The size and complexity of the associated circuit element will vary dependent on the type of cells within the cell library. For example, individual cells may define basic building block structures such as NAND gates, NOR gates, etc, or may define more complicated circuit elements comprising a larger number of interconnected transistors. Further, the cells may be custom cells, or may be standard cells.

Figure 2:
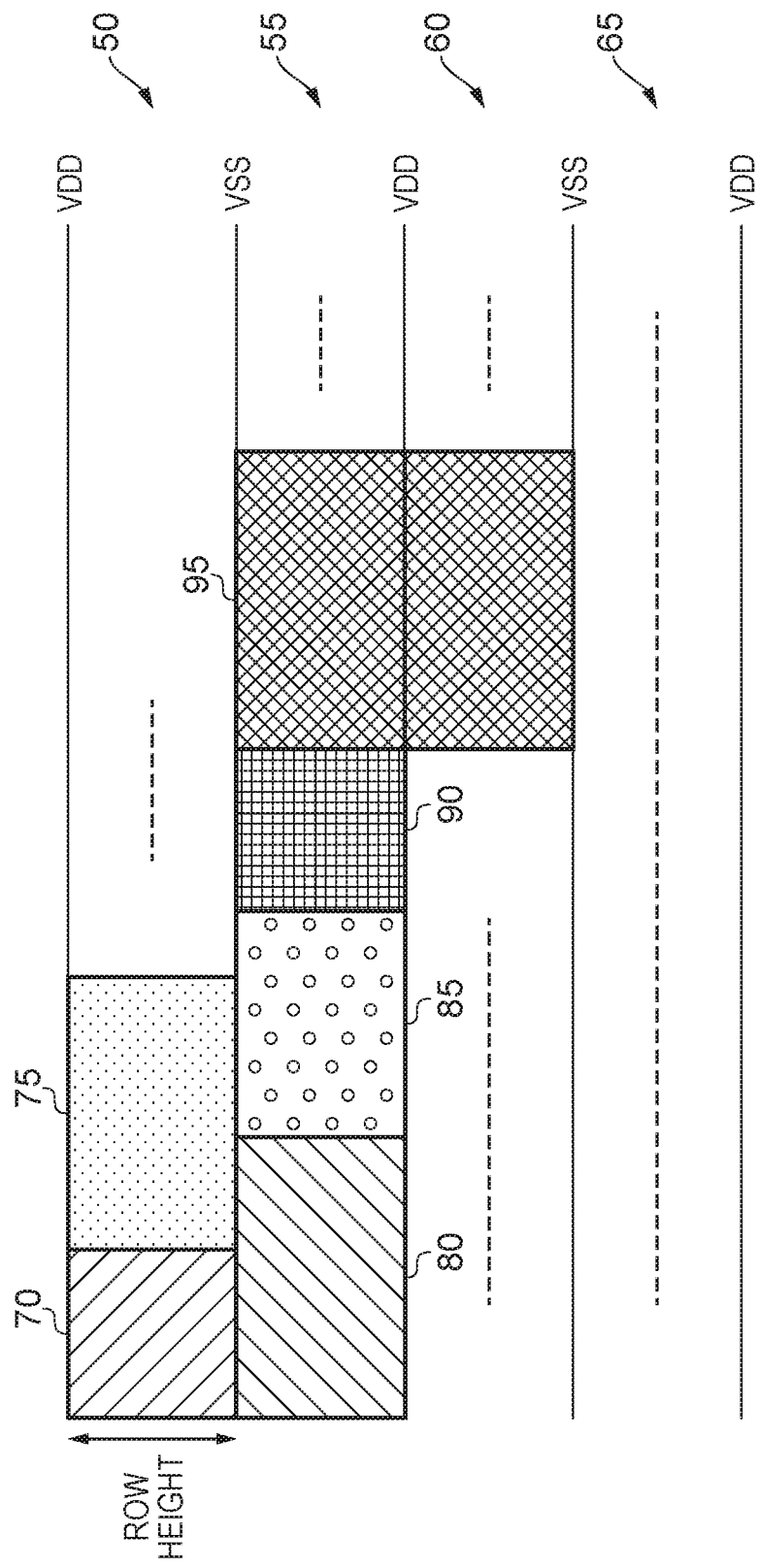
FIG. 2 schematically illustrates placement of standard cells within standard cell rows in accordance with one embodiment.

As will be appreciated by those of ordinary skill in the art, when standard cells are used, they can be laid out within a floorplan considered to comprise of a plurality of standard cell rows, each with a common row height, as illustrated schematically in FIG. 2. In particular, a plurality of standard cell rows 50, 55, 60, 65 may be positioned within the floorplan, and individual standard cells 70, 75, 80, 85, 90, 95 can be placed within those rows by a place and route tool and then interconnected to provide the required logical operation of the circuit block. Not all cells need be active cells that require interconnecting. For example some cells may be inactive cells, such as filler cells or cells implementing decoupling capacitors. Each standard cell is constrained to have a height equal to the row height (as in the example of standard cells 70, 75, 80, 85, 90) or a multiple of the row height (as in the example of the standard cell 95 shown in FIG. 2).

Whilst the use of standard cells can simplify the place and route operations performed when designing the layout of the circuit block, it is not a requirement for standard cells to be used, and in other embodiments at least one cell library 20, 25 available to the synthesis tool 30 may comprise a library of custom cells that are not constrained to conform to a particular row height.

The synthesis tool 30 receives the logical definition 10 of the circuit block, and determines with reference to the available cell library, or cell libraries, the cells that are to be used in order to construct the required functionality of the circuit block. The synthesis operation 30 performed by the synthesis tool in FIG. 1 is performed in the standard manner and accordingly is not discussed in any further detail herein. Once the synthesis operation has been performed, the output is passed to a place and route tool 35, this output identifying the cells to be used and the manner in which those cells need to be interconnected in order to produce circuitry performing the required logical operation of the circuit block.

Figure 3:
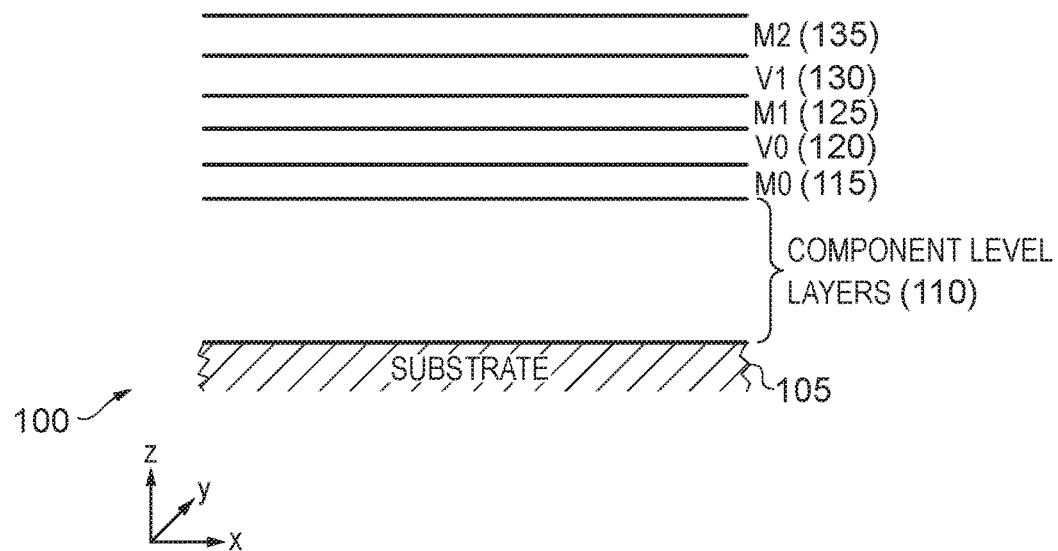
FIG. 3 schematically illustrates the various metal layers and associated via layers that may be provided in one embodiment.

The place and route tool 35 then generates the circuit layout by determining a placement of the various cells identified by the synthesis tool and performing a routing operation to determine routing paths to be provided within a plurality of metal layers in order to interconnect those cells so that they will perform the required logical operation of the circuit block. FIG. 3 is a cross section elevation view showing schematically the various metal layers that may be provided in one embodiment.

Whereas the floorplan layout in FIG. 2 can be considered to extend in the x and y dimensions, the elevation shown in FIG. 3 extends in the z dimension. On a substrate 105 a number of component level layers 110 are provided in order to form the structural components forming the circuit element(s) of the cell. Hence, within the component level layers the various transistors will for example be formed. The metal zero (M0) layer 115 then accommodates a number of metal sections that will be used to provide power to the components of the cell, and to form input and output pins to be connected to the earlier-mentioned routing paths by the place and route tool. In addition, some metal sections may be internal metal sections, also referred to herein as internal nets, used to interconnect different components within the component level layers 110, but which remain isolated from the routing paths provided in the various metal layers.

As shown in FIG. 3, a number of metal layers and intervening via layers may be provided above the component level layers. In this particular example, two additional metal layers are provided above the M0 layer, referred to herein as the metal one (M1) layer 125 and the metal two (M2) layer 135. Each metal layer is connected to an adjacent metal layer by metal via connections provided within the intervening via layers V0 and V1 120, 130 shown in FIG. 3. Whilst only three metal layers are shown in FIG. 3, it will be appreciated that in other embodiments additional metal layers may also be provided.

Often, the cells will define the metal sections of the M0 layer 115, but will not define any metal sections at higher metal layers. However, this is not a requirement and more complex cells may define one or more metal sections at higher metal layers, for example the M1 layer 125. However, for the purposes of the embodiments described herein, it will be assumed that the cell layout terminates with the metal section layout at the M0 layer 115. In such an embodiment, the subsequent M1 and M2 metals layers 125, 135 are then used for routing paths to interconnect the various cells.

As will be understood by those of ordinary skill in the art, the metal sections in the adjacent metal layers typically run in perpendicular directions. For example, if the metal sections in the M0 layer 115 are considered to extend in the x dimension, then the metal sections in the M1 layer 125 will extend in the y dimension, whilst metal sections in the M2 layer 135 will extend in the x dimension. Metal connections in the via layers 120, 135 will then extend in the z dimension between the adjacent metal layers in order to connect metal sections in one layer with metal sections in the adjacent layer. The place and route tool is responsible for performing a routing operation to determine how to use the various metal layers to produce the necessary routing paths to interconnect the cells as required to bring about the functionality of the circuit block specified by the logical definition 10.

Figure 4:
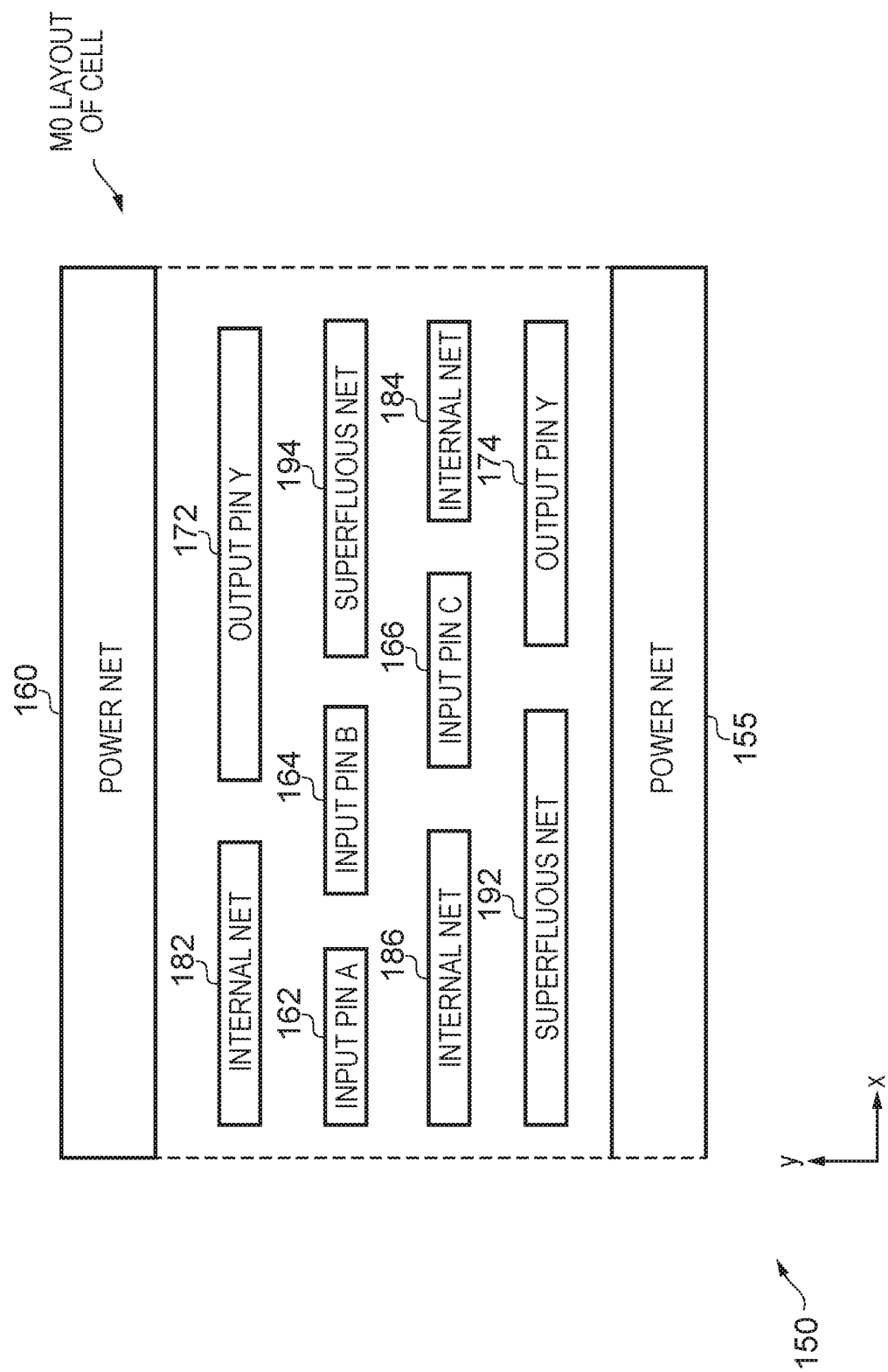
FIG. 4 is a diagram schematically illustrating the various metal sections that may be provided within the metal zero (M0) layout of a cell in one embodiment.

FIG. 4 is a diagram schematically illustrating metal sections that may be provided within the M0 layer layout of a cell 150 in accordance with one embodiment. In this example, it is assumed that the design rules imposed require the metal sections in the M0 layer to follow a regular grid and to fully occupy the assigned tracks of the grid, other than where cuts are required to isolate the different metal sections. As shown in FIG. 4, all of the metal sections extend in the x dimension, with the power net sections 155, 160 extending across the entire width of the cell. This ensures that when the cells are placed in an arrangement such as that illustrated in FIG. 2, the power nets can extend across the entire length of the standard cell rows.

As also shown in FIG. 4, additional metal sections are provided between the two power nets. The only empty space within the M0 layout is the isolation spacing between the various sections imposed by the design rules. As can be seen, this isolation spacing includes spacing at the extremity of the cell so as to isolate the various metal sections from metal sections in an adjacent cell. Further, there are spacings to isolate metals sections within the cell from one another as required so as to enable different metal sections to be associated with different functions. For example, multiple of the metal sections 162, 164, 166 can be used as input pins, and routing paths will be provided to those input pins in order to provide input signals to those various input pins. Similarly, one or more of the metal sections 172, 174 can be associated with output pins, and again will have routing paths connected to them by the place and route tool in order to transfer the output signals from the cell to appropriate locations with the circuit block, for example to provide inputs to one or more other cells.

As also shown in FIG. 4, one or more of the metal sections 182, 184, 186 may represent internal nets, which as discussed earlier are used to interconnect internal components within the cell, but are not used for connection to routing paths, and indeed must remain isolated from such routing paths.

Figure 5:
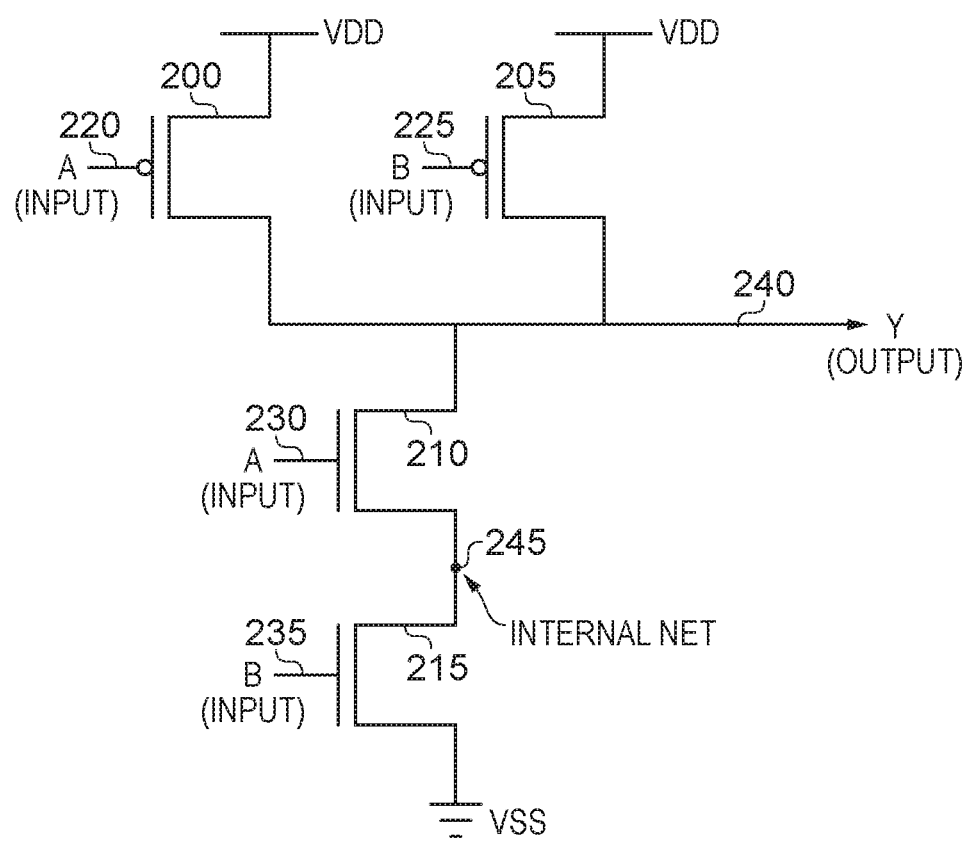
FIG. 5 illustrates input pins, output pins and internal nets for the example circuit element of a NAND gate.

An example of how the various input pins, output pins, and internal nets may be used is illustrated schematically in FIG. 5 with reference to the specific example of a NAND gate. The NAND gate consists of two PMOS transistors 200, 205 connected in parallel between a supply voltage and the output node 240, and two NMOS transistors 210, 215 arranged in series between the output path 240 and a ground voltage supply VSS. Four input nodes 220, 225, 230, 235 are shown, and the nodes 220, 230 may share one input pin within the M0 layout, whilst similarly the two input nodes 225, 235 may share the same input node. The output node 240 will be connected to an output pin within the M0 layout. The interconnection 245 between the two NMOS transistors 210, 215 represents an internal node that will be connected to one of the internal nets within the M0 layout.

Within any particular cell layout design, not all of the metal sections provided to conform to the design rules will need to be used as input pins, output pins or internal nets. These metal sections hence form superfluous metal sections, also referred to herein as superfluous nets, examples of which are denoted by the reference numerals 192, 194 in FIG. 4.

In accordance with known place and route mechanisms, such superfluous nets 192, 194 will be ignored by the place and route tool, and those metal structures will be left in an electrically floating state within the manufactured circuit block. However, as will be apparent from the discussion of embodiments hereafter, in accordance with the described embodiments the operation of the place and route tool 35 is modified so that in some instances it can take advantage of the superfluous nets to increase the flexibility available for determining suitable routing paths to interconnect the various cells.

Returning to FIG. 1, in accordance with the described embodiments each cell within the cell library 20, 25 will have associated cell definition data, and in one embodiment that cell definition data is supplemented so that one or more cells can identify at least one of their superfluous metal sections as being available for routing. The extent to which this is used can vary dependent on embodiment. For example, in one embodiment many of the different types of cells may be arranged to identify one or more of their superfluous metal sections as being available for routing, whilst in alternative embodiments this can be constrained to be used in association with only certain types of cells. Similarly, there is no requirement for all of the superfluous metal sections of a cell to be identified as being available for routing, and instead only a subset of the superfluous metal sections within a particular cell may be identified as available for routing.

As shown in FIG. 1, when the place and route tool 35 is performing its place and route operations, it has access to the information about the required cells from the cell library 20, 25, and that information will include the above mentioned cell definition data. Accordingly, if any of the cells being used by the place and route tool have associated cell definition data that identifies at least one superfluous metal section as being available for routing, that fact can be made available to the place and route tool.

Figure 6:
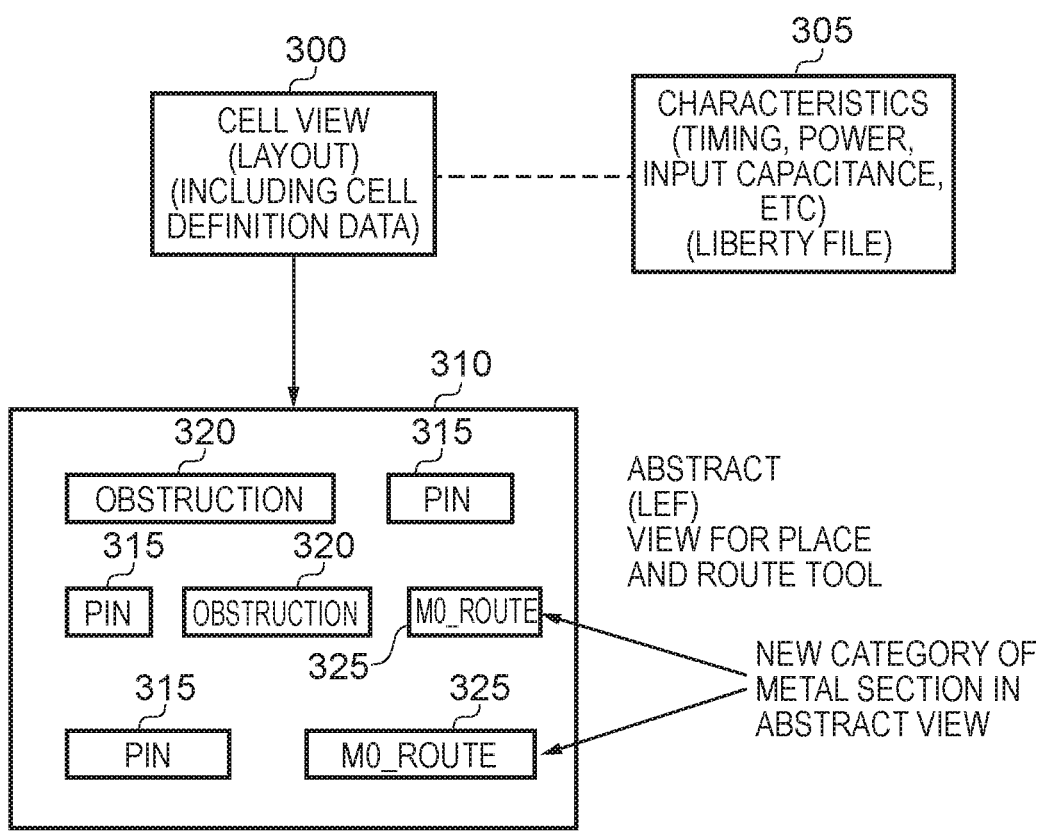
FIG. 6 illustrates various views of a cell that may be provided by the cell library in accordance with one embodiment.

There are a number of ways in which this information can be made available to the place and route tool, but one mechanism is illustrated in FIG. 6. In particular, within the cell library each cell may include a cell view 300 that provides all of the detail of the layout of the cell, and separately may provide information about a variety of characteristics of the cell, such as timing, power consumption, input capacitance, etc. In one embodiment all of these characteristics are specified within a specific file 305, which in one embodiment is referred to as a liberty file. The cell layout view 300 will include all of the detail of the cell, and accordingly will include the earlier-mentioned cell definition data identifying whether any superfluous metal sections within that cell are being made available for routing.

However, the place and route tool 35 does not need all of the detail of the cell view 300, but instead only needs an abstracted view providing the salient information required by the place and route tool in order to discern how to construct the routing paths between the cells. This abstract view 310 is shown in FIG. 6, and is also sometimes referred to as a LEF view. In a standard abstract view of a cell, each of the metal structures provided by the cell will be identified as either being pins 315 or obstructions 320. The pins are those metal sections used to provide inputs to the cell or outputs from the cell, and accordingly are metal structures which need to be connected to by the routing paths determined by the place and route tool. The obstructions 320 are those metal sections which should remain isolated from the routing paths produced by the place and route tool. For example, the earlier-mentioned internal nets will be identified as obstructions 320 within the abstract view 310. In previous known place and route mechanisms, any superfluous nets would typically either be identified as obstructions or ignored within the abstract view 310.

However, in accordance with the described embodiments, another category of structure is provided within the abstract view 310, to identify those superfluous metal sections that the cell has made available for routing. In the embodiments described herein, such metal sections will be considered to exist within the M0 level, and are referred to in FIG. 6 as "M0_route" sections 325. However, in more complex systems, these superfluous metal sections need not be constrained to exist within a single metal layer, and may in fact extend across multiple metal layers, in which event they will be formed by a series of metal strips within multiple metal layers that are interconnected by metal vias.

The abstract view 310 will hence categorise each metal section as being a pin, an obstruction, or a superfluous metal section available for routing. The abstract view will also capture the metal layer or layers within which those various structures reside. Using such an abstract view, the place and route tool can then perform a modified place and route operation, allowing it to take advantage of the availability of such superfluous metal sections in order to increase the options available for creating all of the required routing paths.

Figure 7A:
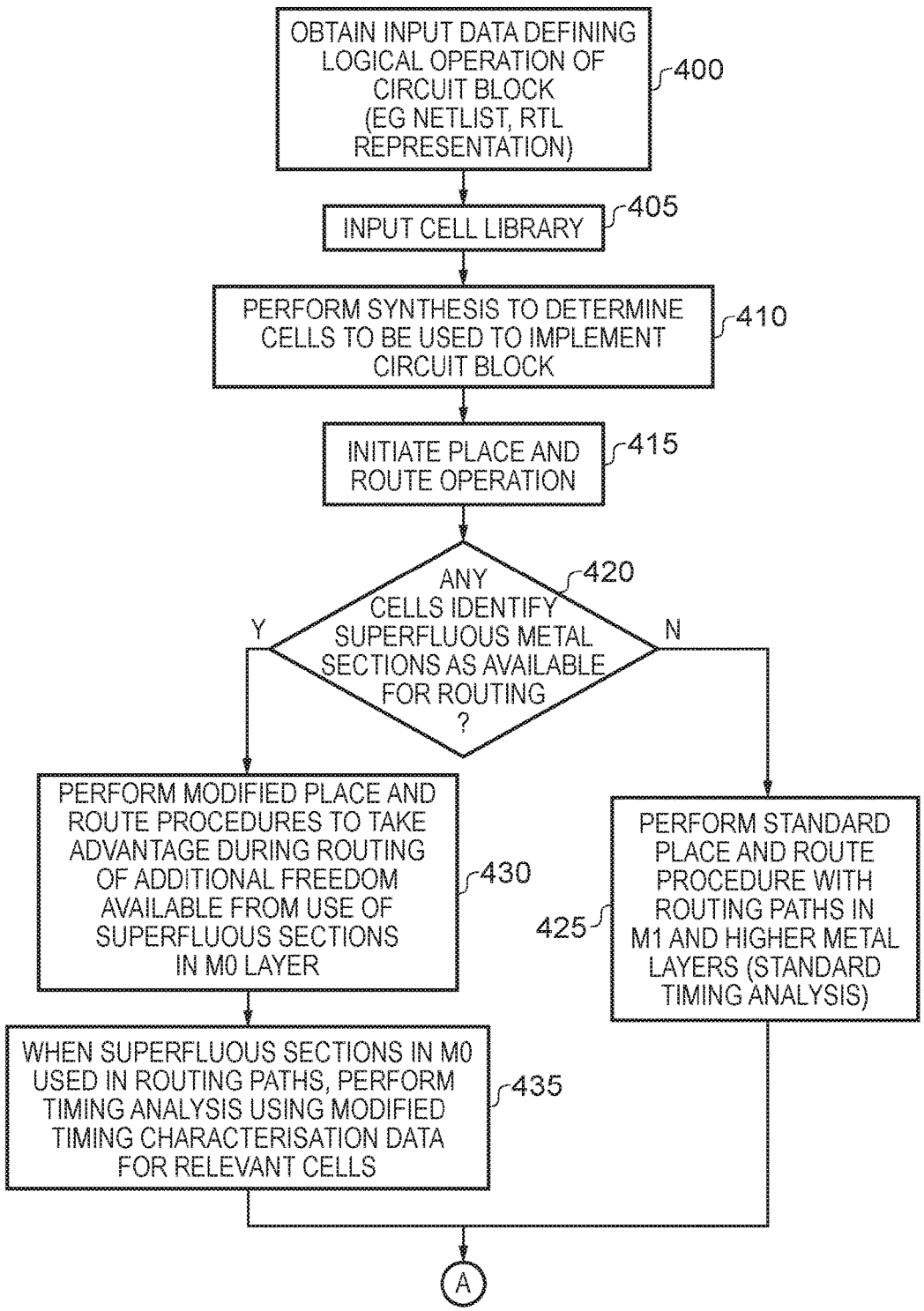
FIGS. 7A and 7B provide a flow diagram illustrating a method in accordance with one embodiment.
Figure 7B:
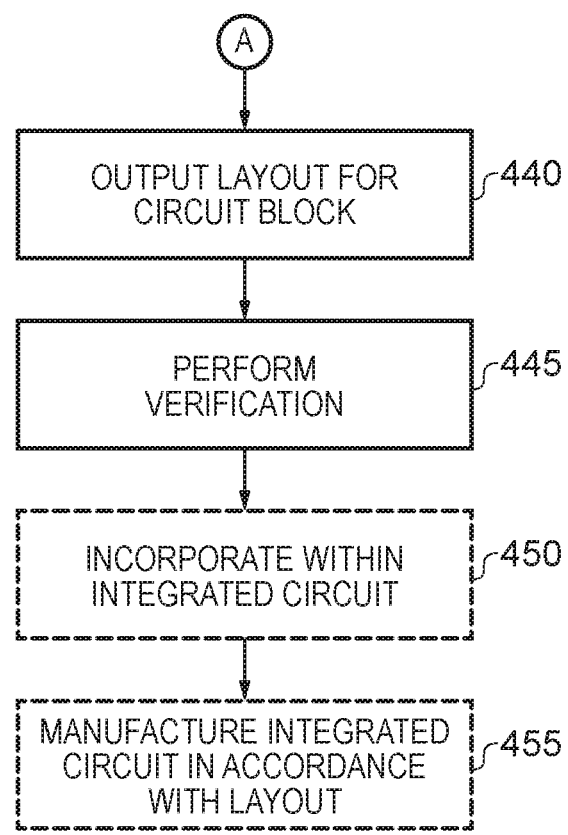

A method for generating a layout of a circuit block that incorporates such a modified place and route operation is illustrated by way of example with reference to the flow diagram of FIGS. 7A and 7B. At step 400, the input data defining the logical operation of the circuit block is obtained, for example as a netlist or an RTL representation. At step 405, the cell library information is also provided as an input. Thereafter, at step 410 the synthesis tool 30 performs a synthesis operation in order to determine the cells that are to be used to implement the required functions of the circuit block. This synthesis operation will also give an indication as to how the cells need to be interconnected in order to perform the desired functionality of the circuit block.

At step 415, the place and route operation will then be initiated, whereafter at step 420 it will be determined whether any of the cells that the synthesis tool has identified are cells that identify one or more superfluous metal sections as available for routing. If this is not the case, then the place and route operation is performed in the standard manner, as denoted by the box 425. In the specific example illustrated in FIG. 7A, it is assumed that the standard procedure involves forming all of the routing paths within the M1 and higher metal layers, and accordingly no routing paths will extend into the M0 layer.

During the performance of the standard place and route procedure, standard block timing analysis operations will be performed. In particular, as candidate routing paths are identified, a timing analysis operation can be performed to determine whether the use of such routing paths will enable the circuit block to meet the desired timing requirements. For example, an operating speed for the circuit block may be specified, and in order for that operating speed to be achieved it will be necessary for the timing of each of the signal routing paths to be within certain timing limits. In one embodiment, the timing characteristics of each of the cells can be pre-characterised and provided as part of the cell library information, for example forming part of the liberty file 305 discussed earlier with reference to FIG. 6. That information can then be referred to by the place and route tool when evaluating the timing of signal paths extending between various cells.

If at step 420 it is determined that one or more of the cells that have been identified by the synthesis tool do identify superfluous metal sections as being available for routing, then the process proceeds to step 430 where modified place and route procedures are performed to take advantage during routing of the additional freedom available from use of the superfluous metal sections (which in this particular example are assumed to exist within the M0 layer).

As will be appreciated by those of ordinary skill in the art, the place and route procedures are an iterative process involving evaluating many different candidate routing paths, taking into account the earlier-mentioned timing analysis for example, in order to produce a set of routing paths that will provide all of the required signal routing between the various cells. During this process, the place and route tool can at step 430 consider candidate routing paths where portions of those paths are provided by superfluous metal sections within the M0 layer. Accordingly, this provides significantly enhanced flexibility, by increasing the number of options available for providing the signal routing paths.

However, the timing characteristics of a cell that provides one or more superfluous metal sections will vary dependent on whether those metal sections are left to electrically float, or whether instead one or more of them is used to form a portion of a routing path, and hence is effectively grounded from the point of view of considering parasitic capacitance issues.

Accordingly, as indicated at step 435, whenever a superfluous section is used in a routing path, the timing analysis performed uses modified timing characterisation data for the relevant cell. In one embodiment, the liberty file 305 produced in association with a cell may include a number of different sets of timing characterisation data. In particular, in addition to the normal timing characterisation data that is based on an assumption that all of the superfluous metal sections will be left to electrically float, at least one additional set of timing characterisation data can be produced based on an assumption that one or more of the superfluous metal sections are used in a routing path. How many additional sets of timing characterisation data are produced will vary dependent on embodiment. Generally speaking, the more superfluous metal sections that are used for routing paths, the greater the adverse impact will be on the timing characteristics of the cell. Accordingly, multiple different sets of timing characterisation data could be produced, making different assumptions as to the number of superfluous metal sections used, and the place and route tool can choose the appropriate set of characterisation data dependent on how the superfluous sections are used.

In an alternative embodiment, just one additional set of timing characterisation data could be included within the liberty file, assuming a worst case timing where all of the superfluous sections of the cell that have been made available for use in routing are in fact used for routing paths. In some implementations, this simplification may be sufficient. For example, the number of superfluous metal sections made available for routing may be relatively small, or their length may be limited, and accordingly assuming the worst case timing will not significantly impact the accuracy of the timing computation.

However, in an alternative embodiment, the place and route tool may be arranged at step 435 to perform on-the-fly characterisation of the cell taking into particular account which superfluous metal sections are in fact used for routing paths. In particular, each of the individual superfluous metal sections may be individually identified to the place and route tool, and each individual superfluous section will then be considered to either be left floating or grounded depending on its routing usage, with computations then being performed to extract the exact parasitic capacitances, and hence characterise the timing of the cell.

Such an on-the-fly timing characterisation approach can provide improved accuracy when determining the timing of the various routing paths, but will increase the complexity of the place and route operation, and increase the time taken to perform the place and route process.

Irrespective of whether the process proceeds via steps 430, 435 or step 425, once the layout has been produced by the place and route tool, that layout is then output at step 440. Thereafter, one or more standard verification steps can be performed at step 445, in order to ensure that the place and route process that has been performed has not introduced any unexpected anomalies.

In some instances, the circuit block whose layout is being generated by the preceding steps will be the entirety of an integrated circuit. However, in an alternative embodiment the circuit block may itself be a component of the integrated circuit, in which case at step 450 that circuit block can be incorporated within the integrated circuit design. It will be appreciated that this step can be achieved in a variety of ways, and may in fact involve reperforming the process of FIGS. 7A and 7B for a new set of input data representing the integrated circuit, where some of that input data effectively defines the layout of the circuit block just generated.

Once the integrated circuit layout has been finalised, then at step 455 the integrated circuit can be manufactured in accordance with the layout.

It will be appreciated that the layout can be output at step 440 in a variety of ways, but in one embodiment this step will involve recording the layout as layout data on a computer readable medium.

Figure 8:
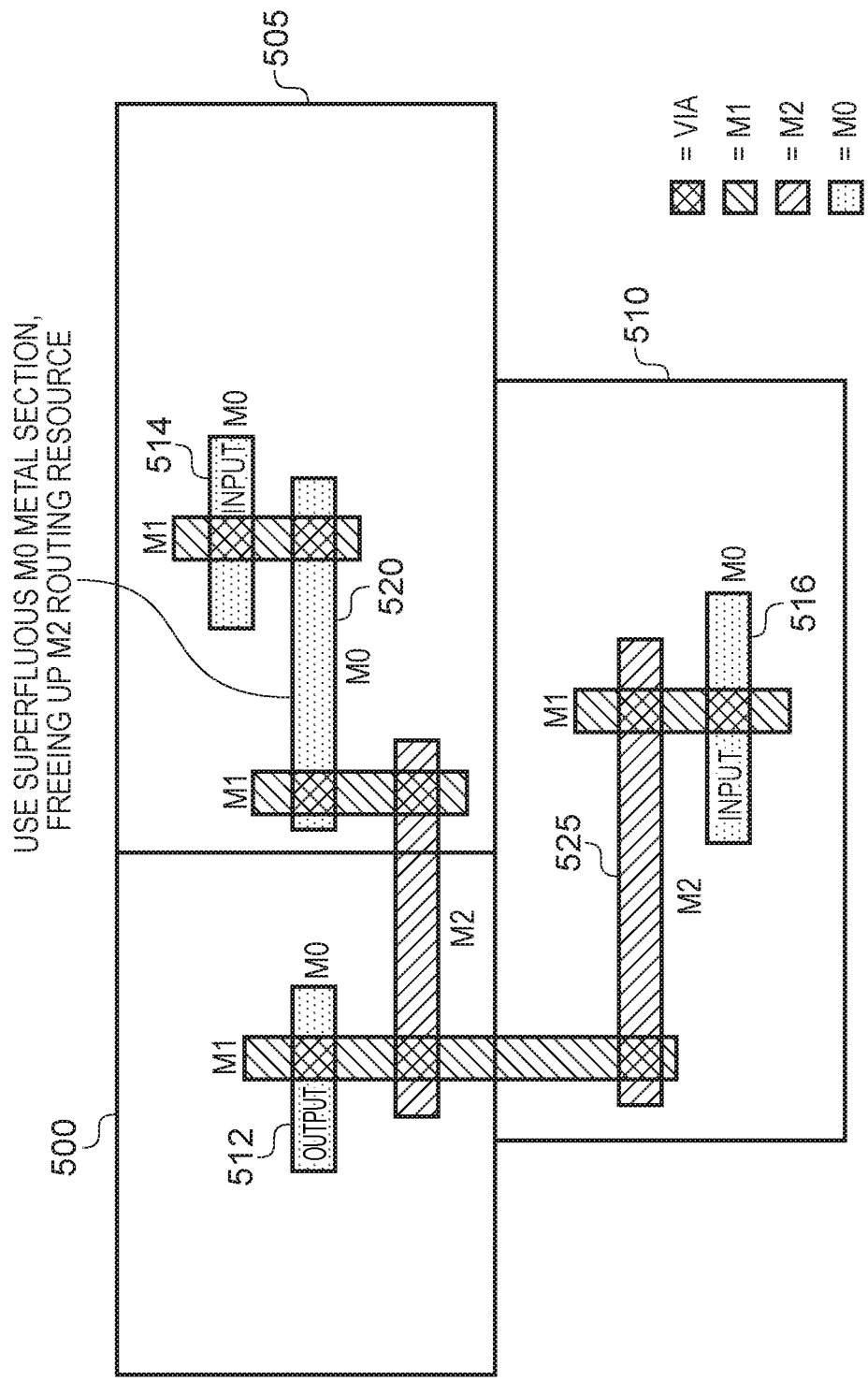
FIG. 8 schematically illustrates how application of the method set out in FIGS. 7A and 7B may result in the use of a superfluous M0 metal section as a portion of a routing path in accordance with one embodiment.

FIG. 8 schematically illustrates some routing paths established between multiple cells 500, 505, 510. In particular, the output signal presented at an output pin 512 of a first cell 500 is routed over a first routing path to an input pin 514 within the cell 505, and via a second routing path to the input pin 516 of the cell 510. As shown in FIG. 8, the routing path from the pin 512 to the pin 516 uses a standard combination of metal one and metal two layers with associated via connections. However, the routing path extending from the output pin 512 to the input pin 514 has a portion 520 which makes use of a superfluous metal section in the M0 layer, thereby freeing up M2 routing resource for other uses.

It should be noted that the M2 section 525 could also in principle be replaced by an equivalent section in the M0 layer, assuming there was a superfluous metal section in the M0 layer extending over that path to enable a connection to be made between the two vertical M1 sections shown in FIG. 8.

Figure 9:
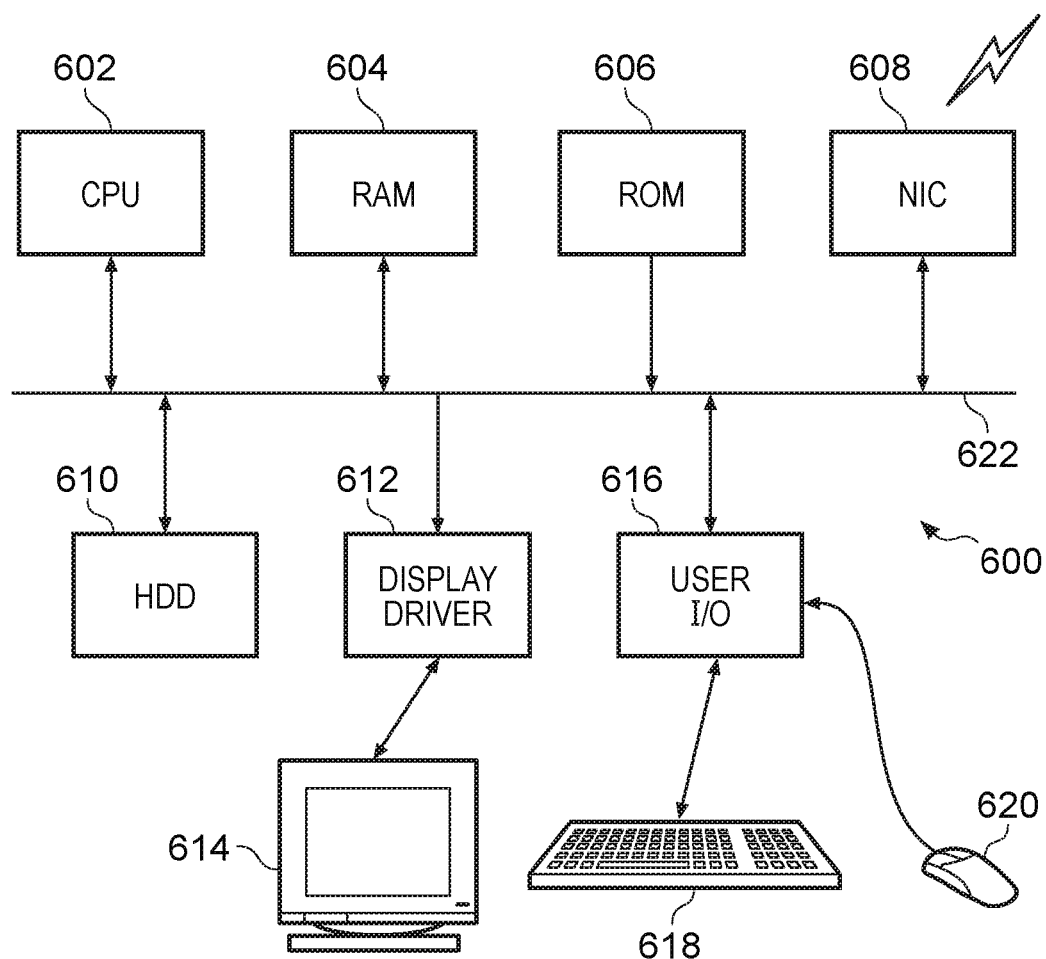
FIG. 9 schematically illustrates a general purpose computer of the type which can be used to implement the present techniques.

FIG. 9 schematically illustrates a general purpose computer 600 of the type that may be used to implement the above described techniques, and in particular the generation of a layout of a circuit block for an integrated circuit. The general purpose computer 600 includes a central processing unit 602, a random access memory 604, a read-only memory 606, a network interface card 608, a hard disk drive 610, a display driver 612 and monitor 614, and a user input/output circuit 616 with a keyboard 618 and mouse 620 all connected via a common bus 622. In operation the central processing unit 602 will execute computer program instructions that may be stored in one or more of the random access memory 604, the read-only memory 606 and the hard disk drive 610, or dynamically downloaded via the network interface card 608. The results of the processing performed may be displayed to a user via the display driver 612 and the monitor 614. User inputs for controlling the operation of the general purpose computer 600 may be received via the user input/output circuit 616 from the keyboard 618 or the mouse 620. It will be appreciated that the computer program could be written in a variety of different computer languages. The computer program may be stored and distributed on a recording medium or dynamically downloaded to the general purpose computer 600. When operating under control of an appropriate computer program, the general purpose computer 600 can perform the above described layout generation techniques and can be considered to form an apparatus for performing the above described techniques. The architecture of the general purpose computer could vary considerably, and FIG. 9 is only one example.

From the above described embodiments, it will be seen that such embodiments provide a mechanism that enables superfluous metal sections, that are required to be provided in one or more metal layers in order to meet design rules required by advanced CMOS processes, to be reused to provide additional routing resource, thereby providing enhanced flexibility to the place and route tool when establishing routing paths between the various cells during the design of a layout of a circuit block. Timing analysis operations can then be adjusted to take account of situations where such superfluous metal sections are indeed used for routing.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A computer-implemented method of generating a layout of a circuit block of an integrated circuit, comprising:
receiving input data defining a logical operation of the circuit block;

accessing a cell library providing a plurality of cells that define circuit elements, to determine with reference to the input data the cells to be used to implement the circuit block; and employing a place and route tool to generate the layout by determining a placement of the determined cells and by performing a routing operation to determine routing paths to be provided within a plurality of metal layers in order to interconnect the determined cells;

the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing, wherein said at least one metal layer containing said one or more superfluous metal sections comprises a metal 0 (M0) layer;

during performance of the routing operation, causing the place and route tool to reference the cell definition data of the determined cells so as to take into account, when determining said routing paths, availability of any superfluous metal sections for routing.

2. The method as claimed in claim 1, wherein:

during performance of the routing operation, at least one superfluous metal section is employed to form a portion of a routing path.

3. The method as claimed in claim 2, wherein the superfluous metal sections other than those employed within the routing paths are metal sections that will be left in an electrically floating state in the circuit block.

4. The method as claimed in claim 1, wherein within cells defining an active circuit element, the M0 layer further provides one or more of:

a power supply metal section to connect to a voltage supply;

an input metal section to connect the active circuit element to an input signal routing path;

an output metal section to connect the active circuit element to an output signal routing path; and an internal metal section to interconnect components of the active circuit element and unavailable to the place and route tool for use as a portion of a routing path.

5. The method as claimed in claim 1, wherein the cells are standard cells, and the place and route tool determines the placement of the determined cells by placing them within a plurality of rows having a common row height.

6. The method as claimed in claim 1, wherein at least one cell whose cell definition data identifies at least one superfluous metal section as available for routing is an inactive cell that has an absence of input and output metal sections.

7. The method as claimed in claim 1, wherein said at least one superfluous metal section identified as available for routing extends over multiple metal layers.

8. The method as claimed in claim 1, further comprising the steps of:

incorporating the layout of the circuit block within a layout of an integrated circuit; and manufacturing the integrated circuit from the layout of the integrated circuit.

9. A computer program product on a non-transitory storage medium for controlling a computer to perform a method of generating a layout of a circuit block as claimed in claim 1.

10. A computer-implemented method of generating a layout of a circuit block of an integrated circuit, comprising:

receiving input data defining a logical operation of the circuit block;

accessing a cell library providing a plurality of cells that define circuit elements, to determine with reference to the input data the cells to be used to implement the circuit block; and employing a place and route tool to generate the layout by determining a placement of the determined cells and by performing a routing operation to determine routing paths to be provided within a plurality of metal layers in order to interconnect the determined cells;

the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing;

during performance of the routing operation, causing the place and route tool to reference the cell definition data of the determined cells so as to take into account, when determining said routing paths, availability of any superfluous metal sections for routing; and providing the place and route tool with an abstract view of each determined cell as derived from the cell definition data, the abstract view identifying each metal section in said at least one metal layer as one of:

an input/output pin to which a routing path is connectable;

an obstruction that must remain isolated from the routing paths; and a superfluous metal section available for routing.

11. The method as claimed in claim 10, wherein any superfluous metal section unavailable for routing is identified as an obstruction in said abstract view.

12. A computer-implemented method of generating a layout of a circuit block of an integrated circuit, comprising:

receiving input data defining a logical operation of the circuit block;

accessing a cell library providing a plurality of cells that define circuit elements, to determine with reference to the input data the cells to be used to implement the circuit block; and employing a place and route tool to generate the layout by determining a placement of the determined cells and by performing a routing operation to determine routing paths to be provided within a plurality of metal layers in order to interconnect the determined cells;

the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing;

during performance of the routing operation, causing the place and route tool to reference the cell definition data of the determined cells so as to take into account, when determining said routing paths, availability of any superfluous metal sections for routing; and during the routing operation, when considering employing at least one superfluous metal section to form a portion of a routing path, performing a timing determination operation to take into account a change in signal timing resulting from use of the at least one superfluous metal section.

13. The method as claimed in claim 12, wherein:

the cell library provides, for each cell, associated timing characterisation data assuming any superfluous metal sections are left to electrically float; and for each cell where at least one superfluous metal section is identified in the cell definition data as available for routing, the cell library provides at least one additional set of timing characterisation data for use by the place and route tool when performing said timing determination operation.

14. The method as claimed in claim 13, wherein:

for each cell where at least one superfluous metal section is identified in the cell definition data as available for routing, the cell library provides one additional set of timing characterisation data for use by the place and route tool when preforming said timing determination operation, said one additional set assuming a worst case timing where all available superfluous metal sections of the cell are used for routing paths.

15. The method as claimed in claim 12, wherein:

the place and route tool performs during said timing determination operation an on-the-fly timing characterisation of an affected cell to take into account a change in signal timing having regard to which of the at least one superfluous metal sections in the affected cell is to form a portion of a routing path.

16. A non-transitory storage medium storing a cell library comprising a plurality of cells that define circuit elements, the cell library providing cells that define in at least one metal layer one or more superfluous metal sections that are required to comply with design rules but which are unused by the cell, each cell having cell definition data, and the cell definition data of one or more cells identifying at least one superfluous metal section as available for routing to a processor-executed place and route tool which is configured to generate a layout for a circuit block by determining a placement of selected cells from the cell library and by referencing the cell definition data of the selected cells to be used to implement a circuit block so as to take into account, when determining routing paths interconnecting the selected cells, availability of any superfluous metal sections for routing, wherein said at least one metal layer containing said one or more superfluous metal sections comprises a metal 0 (M0) layer.

* * * * *